United States Patent [19]

Moskowitz et al.

[11] 4,164,846
[45] Aug. 21, 1979

[54] GAS TURBINE POWER PLANT UTILIZING A FLUIDIZED-BED COMBUSTOR

[75] Inventors: Seymour Moskowitz, Fort Lee; Rossa W. Cole, E. Rutherford, both of N.J.

[73] Assignee: Curtiss-Wright Corporation, Wood-Ridge, N.J.

[21] Appl. No.: 854,123

[22] Filed: Nov. 23, 1977

[51] Int. Cl.$^2$ .............................................. F02C 3/26
[52] U.S. Cl. .................................. 60/39.46 S; 110/263
[58] Field of Search ................. 60/39.18 B, 39.46 S, 60/39.12; 110/245, 263, 265; 122/4 D; 165/106, 107; 431/7

[56] References Cited

U.S. PATENT DOCUMENTS

| | | | |
|---|---|---|---|
| 2,817,499 | 12/1957 | Harding et al. | 165/104 |
| 3,791,137 | 2/1974 | Jubb et al. | 60/39.18 R |
| 4,086,758 | 5/1978 | Harboe | 60/39.46 S |

FOREIGN PATENT DOCUMENTS

| | | | |
|---|---|---|---|
| 687994 | 2/1953 | United Kingdom | 165/104 |
| 935658 | 9/1963 | United Kingdom | 60/39.05 |

OTHER PUBLICATIONS deBiasi, V. *AEP Designing a 60-Mw "PFB" Gas Turbine Plant*, in Gas Turbine World, Mar., 1977, pp. 24–29.
Proceedings of the Fourth International Conference on Fluidized-Bed Combustion; Mitre Corp., 1975 pp. 78–79.

*Primary Examiner*—Louis J. Casaregola
*Attorney, Agent, or Firm*—A. Frederick

[57] ABSTRACT

The gas turbine power plant with a fluidized-bed combustor for the burning of coal comprises a closed circuit or loop cooling system for the fluidized-bed combustor through which is circulated liquid metal. The cooling system includes, in the bed of the fluidized-bed combustor, a first heat exchanger by which the liquid metal absorbs heat from the bed and a second heat exchanger by which heated liquid metal is passed in indirect heat exchange with compressed air to heat the latter, the heated compressed air being mixed with the combustion products discharged from the fluidized-bed combustor at a point upstream from the gas turbines.

5 Claims, 1 Drawing Figure

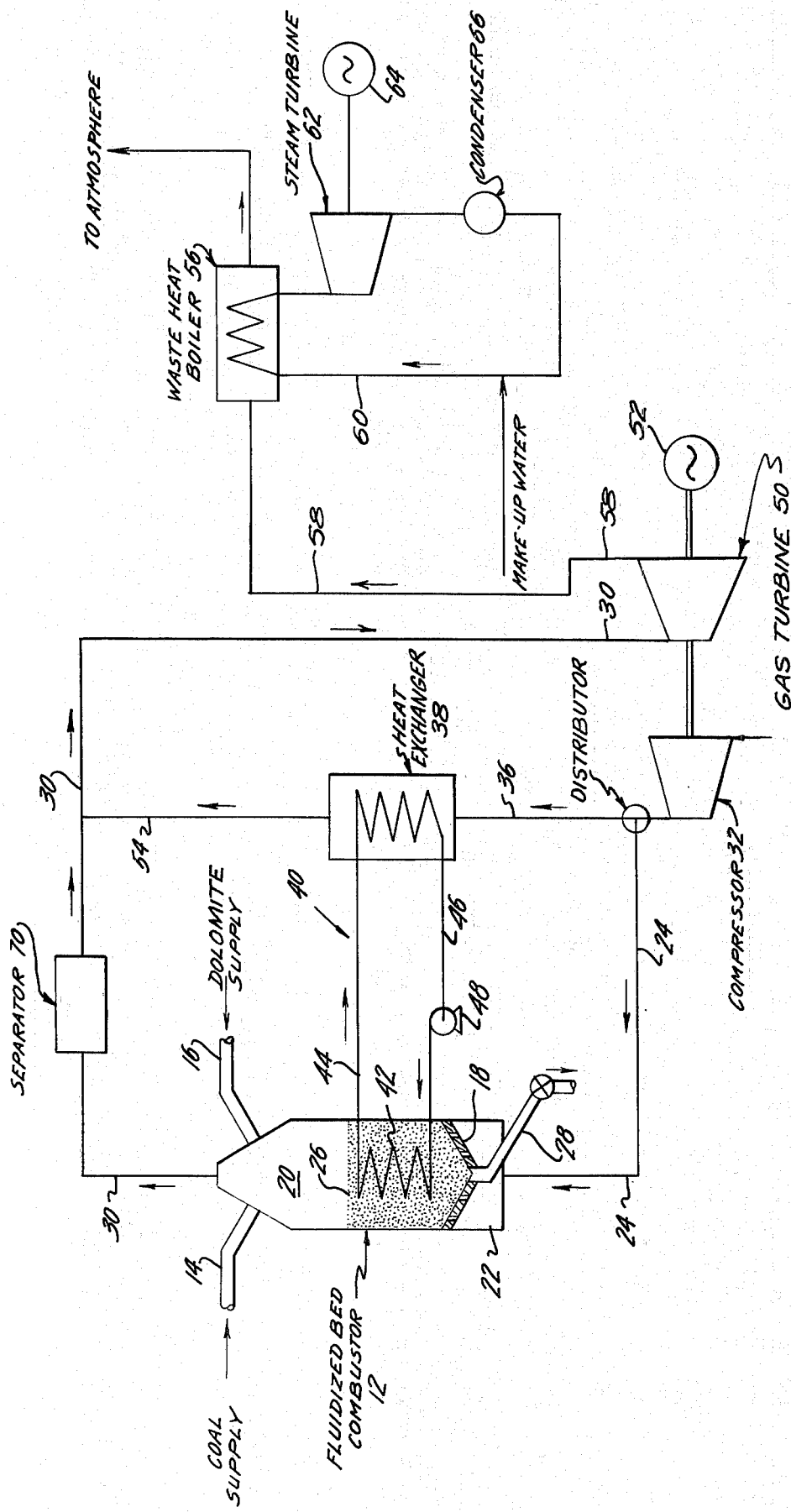

GAS TURBINE POWER PLANT UTILIZING A FLUIDIZED-BED COMBUSTOR

The present invention relates to a gas turbine power plant with a fluidized-bed combustor for the burning of coal.

BACKGROUND OF THE INVENTION

The advent of the energy crises has brought about the desirability of operating gas turbine power-generating plants directly on the gaseous products produced by the burning of coal. Also, since high sulfur content coal is in plentiful supply, the burning of such coal in fluidized-bed combustors is most desirable because the coal is burned in the presence of limestone or dolomite so that the sulfur reacts with the dolomite to form calcium sulfate which is then easily removed with the ash.

It is well known that in fluidized-bed combustors for the burning of coal, as is exemplified in the British patent to Union Carbide Corp., No. 935,658, dated Sept. 4, 1963, the temperature in the combustor bed must be kept below the fusion point of the ash. Accordingly, it is common practice to provide heat exchange means in the combustor bed through which controlled amounts of cooling fluid flow effects maintenance of the bed temperatures within a specified range below the fusion point of the ash. The cooling fluid, as exemplified in the U.S. Patent to Jubb et al, U.S. Pat. No. 3,791,137, dated Feb. 12, 1974, may be helium or water or air as disclosed on page 79 of the report entitled "The Proceedings of the Fourth International Conference on Fluidized Bed Combustion" sponsored by ERDA and coordinated by the MITRE Corporation. One development in fluidized-bed combustion systems disclosed on page 325 of the aforesaid report calls for passage of about two-thirds (⅔) of the total compressed air generated through a tube bundle immersed in the bed for temperature control and the remaining one-third (⅓) used to fluidize and support combustion in the bed, the heated air passing from the bed into mixture with the discharged combustion gases. In this system the problem of carry-over of alkali metals, ash and other particulate material to the gas turbine is reduced since the heated compressed air is clean. Because of the relatively low heat transfer coefficient of air, the heat exchanger units must be relatively large in size to provide the necessary rate of heat transfer. Also, in such systems, if a rupture occurs in the tubes in the bed, escape of air into the bed will change the bed depth from the level for optimum efficiency and reduce the amount of clean air mixed with the discharged combustion products, all of which is detrimental to the efficiency of such systems. These and other disadvantages of presently known fluidized-bed combustion power systems are overcome by this invention.

It is, therefore, an object of this invention to provide a gas turbine power system utilizing a fluidized-bed combustor for burning coal which has improved heat transfer rates so that the heat exchangers may be of smaller size for the same system capacity.

It is another object of the present invention to provide a gas turbine power system utilizing a fluidized-bed combustor for burning coal wherein compressed air is heated by the heat in the fluidized bed without the attendant risk of leakage of such air into the bed and with negligible possibility of burn-out of heat transfer tubes immersed in the fluidized bed.

It is a further object of the present invention to provide a gas turbine power system having a fluidized-bed combustor for burning coal which is capable of operating at high temperature levels for optimum thermodynamic efficiency.

SUMMARY OF INVENTION

Now, therefore, the present invention provides a novel gas turbine power generating system, utilizing a fluidized-bed combustor for burning coal therein, comprising a closed-loop, liquid-metal cooling system for the fluidized bed and an air compressing means for compressing air to an elevated pressure. Also, the power generating system has a gas turbine for driving a power generating means. A conduit means is provided for receiving the compressed air discharged from the air compressing means and for conducting such discharged air into two streams, one stream being conducted into said fluidized-bed combustor for fluidizing the bed and supporting combustion in the bed of the combustor and the other stream being conducted to the closed-loop cooling system. A discharge means is connected to the fluidized bed combustor for conducting the products of combustion from the fluidized-bed combustor to the gas turbine to effect operation of the latter. The closed-loop, liquid-metal cooling system is constructed and arranged to provide for circulating liquid-metal, as for example sodium, sodium-potassium alloys, or other low-melting point metals or alloys, in indirect heat exchange relationship with the fluidized bed of the combustor to absorb heat from the latter. To utilize the heated compressed air for assisting in driving the gas turbine, a conduit means is provided for conducting the heated compressed air from the closed-loop, liquid-metal cooling system and delivering the compressed air into admixture with the products of combustion at a point upstream from the gas turbine.

A pump may also be provided in the closed-loop, liquid-metal cooling system to provide forced circulation of the liquid-metal in this sub-system. In addition, the gas turbine power generating system preferably has a filtering means in the conduit means to remove particulate material entrained in the gaseous products of combustion before such products of combustion enter the gas turbine.

For further thermal efficiency, the gas turbine power generating system may be provided with a waste heat boiler to receive exhaust gases from the gas turbine and pass such exhaust gases in heat exchange relationship with water to convert the latter to steam, the steam being utilized in any suitable manner, as for example, by driving a steam turbine which, in turn, drives an electrical generator.

BRIEF DESCRIPTION OF DRAWINGS

The invention will be more fully understood from the following description when considered in connection with the accompanying drawing in which is schematically shown a gas turbine power system employing a fluidized-bed combustor for burning coal according to this invention.

DESCRIPTION OF PREFERRED EMBODIMENTS

Now referring to the drawing, the reference numeral 10 generally designates the gas turbine power generating system according to this invention, which system utilizes a fluidized-bed combustor 12 for the burning of coal to generate gaseous products of combustion.

The fluidized-bed combustor 12 may be of any suitable construction in which pulverized coal is burned in the presence of limestone or dolomite so that the sulfur in the coal reacts with the dolomite to produce calcium sulfate which is easily removed from combustor 12 along with the ash and other waste material. Pulverized coal and dolomite are delivered into combustor via inlet ducts 14 and 16, respectively. A distribution baffle 18 is provided to divide the interior of the combustor into a combustion zone 20 and a plenum 22. A compressed air supply pipe 24 is connected to the combustor to deliver compressed air to plenum 22. The distribution baffle 18 has openings through which the compressed air passes from plenum 22 into combustion zone 20 to maintain a suspension of the coal and dolomite particles and form a fluidized-bed 26. The ash formed by the combustion of the coal, along with calcium sulfate, is removed from combustion zone 20 by way of a gate controlled discharge duct 28, while the gaseous products of combustion are conducted from combustion zone 20 via a discharge conduit 30.

The compressed air is produced by an air compressor 32 of any suitable construction which is driven by a gas turbine 50 or other source of power. The discharge end of compressor 32 is connected to supply pipe 24 and a pipe 36 so that the discharged compressed air is divided into two streams, the one stream flowing via pipe 24 to the combustor 12 and the other flowing via pipe 36 to a heat exchanger 38. The heat exchanger 38 is part of a liquid-metal, closed-loop cooling system 40 for maintaining the temperature of fluidized-bed 26 below the fusion point of the ash.

The cooling system 40, in addition to heat exchanger 38, comprises a heat exchanger 42 which may consist of a plurality of tubes or a coil and pipes 44 and 46 interconnecting heat exchanger 42 to heat exchanger 38 to form closed fluid-conducting circuit. Liquid metal, such as sodium, potassium-sodium alloys, or other low melting-point liquid metals, may be circulated between heat exchangers 38 and 42 by a pump 48. The cooling system functions to absorb heat from fluidized-bed 20 by the liquid metal flowing in indirect heat exchange relationship with bed 26. The heated liquid metal is conducted by pipe 44 to heat exchanger 38 where the heated liquid metal is passed in indirect heat exchange relationship with compressed air delivered to the heat exchanger by pipe 36 to give up heat to the compressed air. The cooled liquid metal is recirculated back to heat exchanger 42 via pipe 46 and pump 48.

The gas turbine 50 is connected to drive an electrical generator 52 as well as compressor 32. The gas turbine 50 is connected to discharge conduit 30 to receive gaseous products of combustion from combustor 12 to thereby be driven by the expansion of such gases therein. To supplement the gaseous products of combustion, the compressed air heated in heat exchanger 38 is delivered into admixture with the gaseous products of combustion in discharge conduit 30 upstream from gas turbine 50 by a pipe 54. The amount of heated compressed air delivered from heat exchanger 38 to gas turbine 50 may be about two-thirds (⅔) of the total air discharged from compressor 32, the other portion of the total air being delivered to the combustor for supporting combustion and fluidizing bed 20. The thermodynamic balance of gas turbine power generating system 10 is such that the temperature of the heated compressed air is approximately that of the gaseous products of combustion at the point of their being brought in admixture.

To further extract useful energy from gas turbine power generating system 20, the system may also include a waste heat boiler 56 which receives exhaust gases from gas turbine 50 through a conduit 58 and water from a water supply line 60. The steam generated in waste heat boiler 56 is conducted to a steam turbine 62 to drive the latter, the steam turbine, in turn, driving an electrical generator 64.

The steam discharged from steam turbine 62 is recovered in a condenser 66 and recirculated to waste heat boiler 56 together with make-up feed water via line 60.

Alternatively, the exhaust from gas turbine 50 may be conducted to a lower pressure turbine (not shown) to drive compressor 32.

Also, without departing from the scope and spirit of this invention system 10 may also be provided with a filter means 70 of any suitable type which will effectively remove from the gaseous combustion products, entrained particulate matter before such gaseous combustion products enter gas turbine 50.

It is believed now readily apparent that the present invention provides a gas turbine power system having a fluidized-bed combustor in which improved rates of heat transfer are achieved by reason of a closed-loop, liquid-metal, cooling system and wherein burn-out of cooling tubes is minimized and the supply of heated compressed air to the gas turbine is assured.

Although but one embodiment of the invention has been illustrated and described in detail, it is to be expressly understood that the invention is not limited thereto. Various changes can be made in the arrangement of parts without departing from the spirit and scope of the invention as the same will now be understood by those skilled in the art.

What is claimed is:

1. A gas turbine power system having a fluidized-bed combustor for the burning of coal therein, the system comprising:
   (a) a closed-loop, liquid-metal cooling system for the fluidized-bed combustor;
   (b) an air compressing means for compressing air to a high pressure;
   (c) conduit means for receiving the compressed air discharged from the air compressing means and for conducting such discharged compressed air in two streams, one stream thereof being conducted into said fluidized-bed combustor for fluidizing the bed and supporting combustion in the bed of the combustor and the other stream being conducted to the closed-loop cooling system;
   (d) a gas turbine for driving a power generating means;
   (e) discharge means connected to the fluidized-bed combustor for conducting the products of combustion from the fluidized-bed combustor to the gas turbine to drive the latter;
   (f) said closed-loop, cooling system having means for circulating liquid metal in indirect heat exchange relationship with the fluidized-bed combustor so as to absorb heat from the latter and the heated liquid metal in indirect heat exchange with said other stream of compressed air to surrender heat to the latter; and
   (g) a conduit means for conducting the heated compressed air from the closed-loop, liquid-metal cooling system to the discharge means and into admixture with the products of combustion at a point upstream from said gas turbine.

2. The system of claim 1 wherein said means of said closed-loop cooling system includes:
 (2-a) a first heat transfer means in the fluidized bed combustor exposed to the heat generated by combustion in said combustor;
 (2-b) a second heat transfer means remote from the fluidized-bed combustor and connected to receive the other stream of compressed air from said air compressing means;
 (2-c) conduit means interconnecting said first and second heat transfer means to provide a closed circulation path of liquid metal successively through said first and second heat transfer means so that the liquid metal indirectly absorbs heat in said first heat transfer means and loses heat indirectly to the other portion of the compressed air flowing through said second heat transfer means.

3. The system of claim 2 wherein said closed-loop cooling system includes a circulating pump in said conduit means to effect circulation of liquid metal in the cooling system.

4. The system of claim 1 wherein means is provided to divide said compressed air discharged from said compressor so that said one stream is about one-third of the total discharged compressed air.

5. A power system having a fluidized-bed combustor for the burning of coal therein, the system comprising:
 (a) compressing means for compressing air;
 (b) first conduit means for conducting a first portion of said compressed air from said compressing means into said fluidized-bed combustor for fluidizing the bed and supporting combustion in said bed;
 (c) second conduit means for conducting the second portion of said compressed air from said compressing means;
 (d) a gas turbine for driving a power generating means;
 (e) discharge means connected to the fluidized-bed combustor for conducting the products of combustion from the fluidized-bed combustor to the gas turbine to drive the latter;
 (f) a closed-loop cooling system for the fluidized-bed combustor comprising:
  f-1 a first heat transfer means in the fluidized-bed combustor exposed to the heat generated by combustion in said combustor;
  f-2 a second heat transfer means remote from the fluidized-bed combustor and connected to receive the second portion of the compressed air from said compressing means;
  f-3 third conduit means interconnecting said first and second heat transfer means to provide for continuous circulation of liquid metal successively through said first and second heat transfer means so that the liquid metal indirectly absorbs heat in said first heat transfer means and loses heat indirectly to the second portion of the compressed air flowing through said second heat transfer means;
 (g) a fourth conduit means for conducting heated compressed air from the second heat transfer means to the discharge means and into admixture with the products of combustion at a point upstream from said gas turbine.

* * * * *